United States Patent [19]
Olive

[11] Patent Number: 5,024,580
[45] Date of Patent: Jun. 18, 1991

[54] CONTROL OF VARIABLE STATOR VANES

[75] Inventor: Clive E. Olive, Bristol, England

[73] Assignee: Rolls-Royce plc, London, England

[21] Appl. No.: 538,784

[22] Filed: Jun. 15, 1990

[30] Foreign Application Priority Data

Jun. 17, 1989 [GB] United Kingdom ............... 8913988

[51] Int. Cl.$^5$ ..................... F01D 17/00; F01D 9/00
[52] U.S. Cl. ................... 415/150; 415/162; 403/260; 403/261
[58] Field of Search .......... 415/148, 150, 151, 155, 415/159, 160, 162, 163; 403/258, 259, 260, 261

[56] References Cited

U.S. PATENT DOCUMENTS

| | | | |
|---|---|---|---|
| 2,930,579 | 3/1960 | Boyd et al. | 415/160 |
| 3,736,070 | 5/1973 | Moskowitz et al. | 415/147 |
| 4,314,791 | 2/1982 | Weiler | 415/159 |
| 4,363,600 | 12/1982 | Thebert | 415/156 |
| 4,668,116 | 5/1987 | Ito | 403/258 |
| 4,668,165 | 5/1987 | Ludwick | 415/151 |
| 4,826,399 | 5/1989 | Perez | 415/150 |

FOREIGN PATENT DOCUMENTS

| | | |
|---|---|---|
| 837649 | 11/1957 | United Kingdom . |
| 2159887A | 5/1985 | United Kingdom . |
| 2176251A | 5/1986 | United Kingdom . |

Primary Examiner—Edward K. Look
Assistant Examiner—Hoang Nguyen
Attorney, Agent, or Firm—Oliff & Berridge

[57] ABSTRACT

In a gas turbine engine having a set of variable stator vanes, a vane actuator ring, and a set of actuator levers linking the vanes to the ring in a one-to-one relationship, an improved manner of linking the vanes to the ring comprises providing a lever of thin sheet material and clamping a trough-shaped end of the lever to a wedge-shaped end of vane stem so that the lever takes up the profile of the end of the stem.

5 Claims, 4 Drawing Sheets

CONTROL OF VARIABLE STATOR VANES

BACKGROUND OF THE INVENTION

This invention concerns improvements in or relating to the control of variable stator vanes in a gas turbine engine, and in particular concerns an improved manner of attaching an actuating lever to a variable stator vane.

During operation of a gas turbine engine using a multi-stage axial compressor the turbine rotor is turned at high speed by the turbine so that air is continuously induced into the compressor, accelerated by the rotating blades and swept rearwards onto an adjacent row of stator vanes. Each rotor blades/stator vanes stage increases the pressure of the air passing through, and at the final stage of a multistage compressor the air pressure may be 30 times ambient atmospheric pressure, i.e. an overall pressure ratio of 30:1.

In addition to translating the kinetic energy of the air into pressure the stator vanes also serve to correct the deflection given to the air by the rotor blades and to present the air at the correct angle to the next stage of rotor blades.

The more the overall pressure ratio of a compressor is increased the more difficult it becomes to ensure that it will operate efficiently over the speed range of the engine. This is because the requirement for the ratio of inlet area to exit area, in the high speed case, results in an inlet area that becomes progressively too large relative to the exit area as compressor speed and hence pressure ratio is reduced. The axial velocity of the air in the front stages thus becomes low relative to the blade speed, changing the incidence of the air onto the blades, and bringing about a condition where the flow over the blades separates and compressor flow breaks down, thereby resulting in a sudden loss of power known as "surging".

Where high pressure ratios are required from a single compressor the above problem is preferably overcome by introducing variable stator vanes into the system. Variable stator vanes permit the incidence of air onto the rotor blades to be corrected to angles which the rotor blades can tolerate.

The manner of operation of a known variable stator vane system will be described with reference to FIG. 1 of the accompanying drawings which shows a cut-away side view of part of a compressor section of an aircraft gas turbine engine.

In FIG. 1 there is shown the compressor section 10 of an aircraft gas turbine engine. In the tubular casing 12 of the compressor section are mounted sets of stator vanes 14 circumferentially about the central axis of the compressor section. A corresponding set of rotor vanes 16 is mounted downstream of each set of stator vanes 14. Each stator vane 14 terminates at the casing 12 in a stem 18 rotatable in a bush bearing 20 on the outside of the casing, the end of the stem extending beyond the bush.

Located externally of the casing 12 and adjacent each set of stator vanes 14 are actuator rings 22 extending circumferentially round the casing. With each stator vane 14 in a set, the vane stem 18 is connected to the corresponding actuator ring 22 by means of an actuating lever 24. One end of the actuating lever 24 is clamped to the end of the vane stem 18 by means of a bolt 26 so that there is no relative movement between the stem and the lever. The other end of the lever 24 is connected to the actuator ring 22 by a pin 28 rotatable in a bush bearing located in the ring.

The actuator ring 22 is arranged so that it may be rotated about the central axis of the compressor section, i.e. in either direction of arrow 9. Consequently, rotation of the actuator ring 22 will, by means of the actuating levers 24, cause rotation of each stator vane 14 about its own axis and thus enable the vanes 14 to assume required angles of incidence to the incoming air. A disadvantage of the geometry of this arrangement is that, as the actuator ring 22 rotates, there is a tendency for each actuating lever 24 to rotate about its longitudinal axis and, because of its stiffness, to loosen the retaining bolt 26. It is further necessary for the actuating lever 24 to resist surge loads in the engine. Hitherto, these problems have been solved by providing forged vane levers 24. However, these are costly, need extensive machining, and generate a weight penalty.

It is an object of the present invention to provide a variable vane actuating lever, and a manner of mounting the lever on a vane stem, such as to overcome the above-mentioned disadvantages.

SUMMARY OF THE INVENTION

According to a first aspect of the present invention there is provided in a gas turbine engine having a set of variable stator vanes and a vane actuator ring, a vane actuator lever linking a vane to the ring, the lever being pivotally attached at one end to the vane actuator ring and at the other end immovably attached to a respective stator vane, the lever being shaped so as to resist bending but able to twist about its longitudinal axis.

According to a second aspect of the present invention there is provided in a gas turbine engine having a set of variable stator vanes, a vane actuator ring, and a set of actuator levers linking the vanes to the ring in a one-to-one relationship, an improved manner of linking the vane actuator ring to the vanes wherein, (a) with regard to each vane, that end of the vane stem distal from the longitudinal axis of the engine is formed in the shape of a truncated wedge, (b) with regard to each actuator lever, the lever comprises a metal strip pinned at one end to the actuator ring so as to be rotatable about the pinning, the other end of the lever having opposed edges bent towards each other at an angle, when the lever is unconstrained, greater than the wedge angle of said end of the vane stem, to form a trough generally facing the longitudinal axis of the engine and adapted to locate onto said end of the vane stem in a cooperative relationship, (c) there is provided clamp means associated with each stator vane and actuator lever, the clamp means being provided with a channel shaped to fit over the trough end of the actuator lever when located on said end of the stator vane stem, opposed faces of the channel each being provided with an inwardly facing projection arranged to deform the trough end of the lever into full planar contact with wedge faces of the end of the vane stem, and (d) there is provided means to retain the clamp means in a clamping relationship with the vane stem.

The invention will now be described by way of example only with reference to diagrammatic FIGS. 2-5 of the accompanying drawings, which are not to scale, in which,

DESCRIPTION OF THE PREFERRED EMBODIMENT

Figure 1:
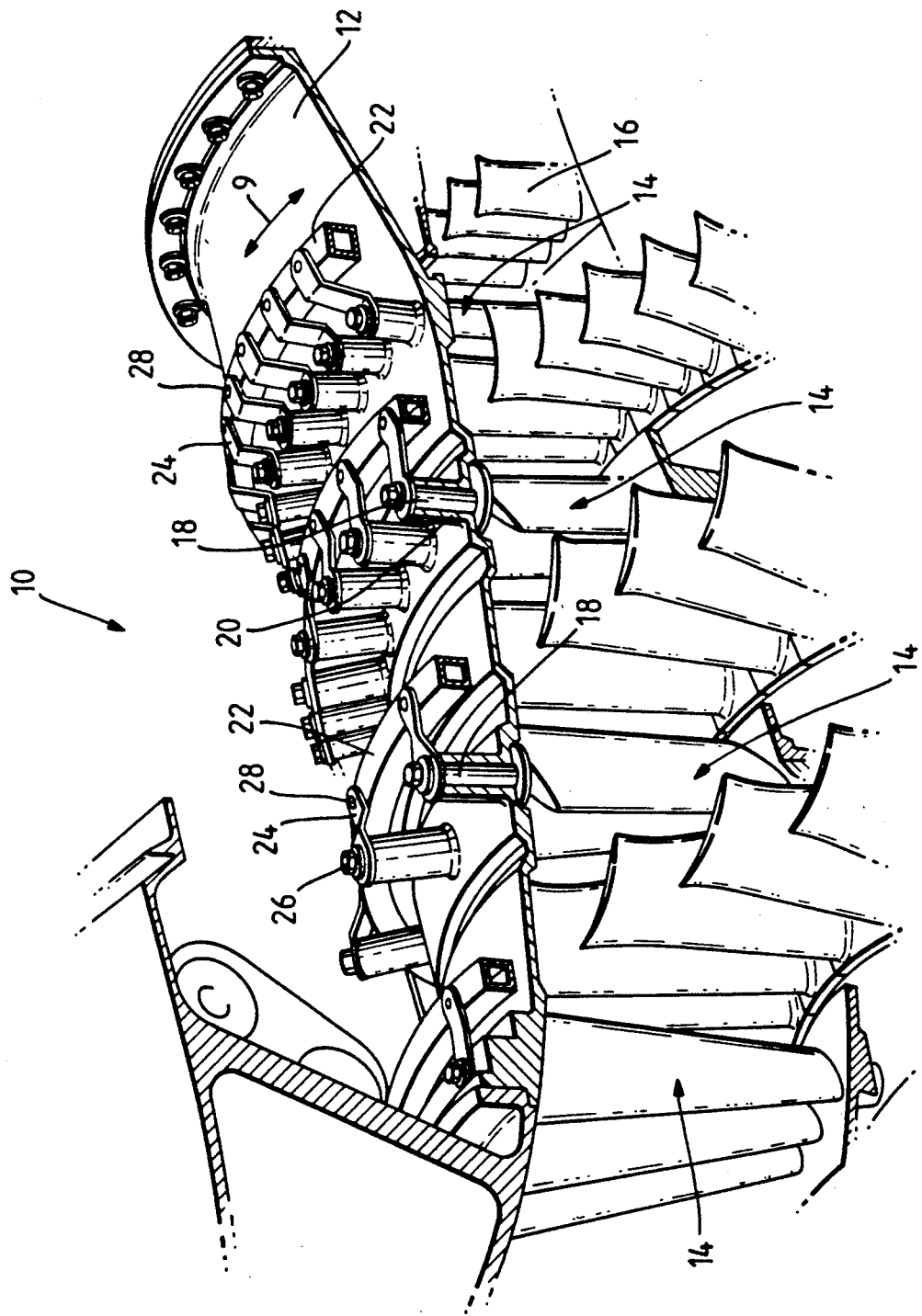
FIG. 1 is a cut-away side view of part of a compressor section of an aircraft gas turbine engine.
Figure 2:
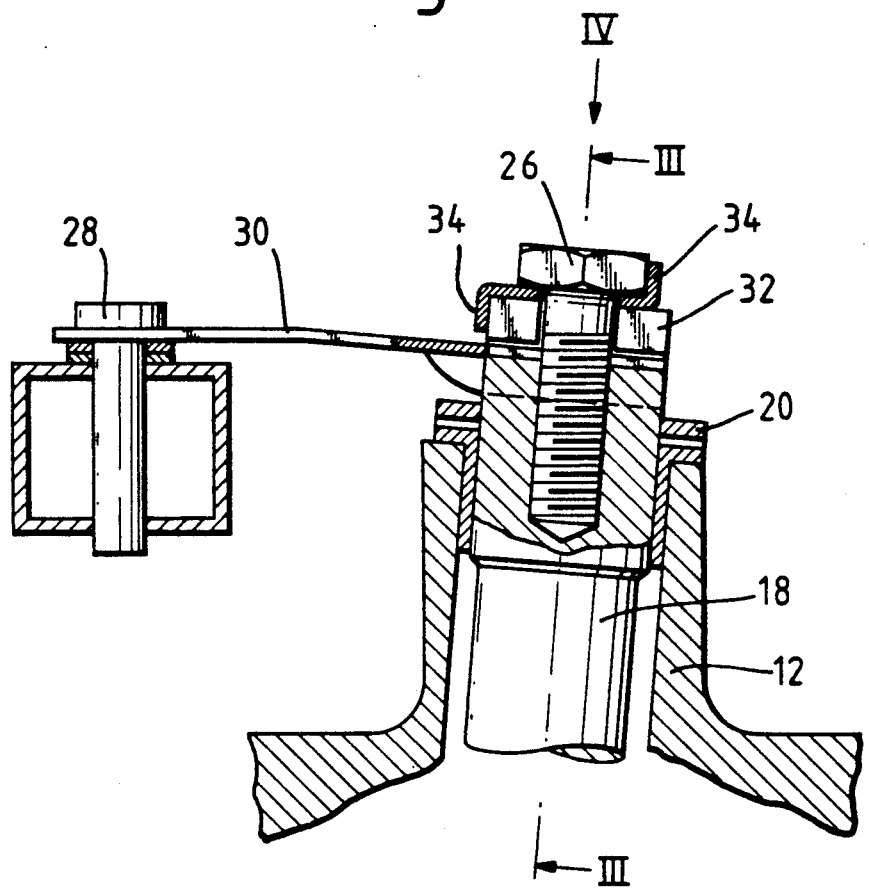
FIG. 2 is a sectioned side view of a stator vane assembly.

Referring to FIGS. 2-5 of the drawings there is shown the stator vane stem 18 of FIG. 1 mounted in bush bearing 20 located in compressor casing 12. There is provided a vane lever 30 according to the invention comprising a thin metal strip, one end of which is secured to the axially distal end of the stator vane stem 18 by means of a clamp 32 and a bolt 26 screwed into an axial hole in the vane stem and passing through respective holes 7, 8 in the lever and the clamp. A tab washer 34 is provided between the clamp 32 and the head of the bolt 26. The other end of the vane lever 30 is secured to the actuator ring 22 by means of pin 28. The actuator ring 22 is bushed so that the pin 28 is rotatable therein, as described above with reference to FIG. 1.

The end of the vane stem 18 in which the bolt 26 is located is in the shape of a truncated wedge, having angled faces 36a, 36b either side of an end face 46 of the stem. This is known as a "cottage roof" vane stem.

Figure 5:
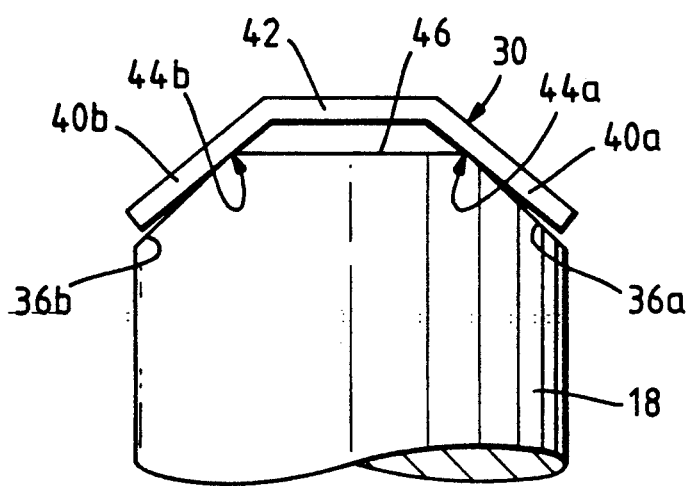
FIG. 5 is a section through the vane lever and clamp of FIG. 3 in an unassembled condition.
Figure 3:
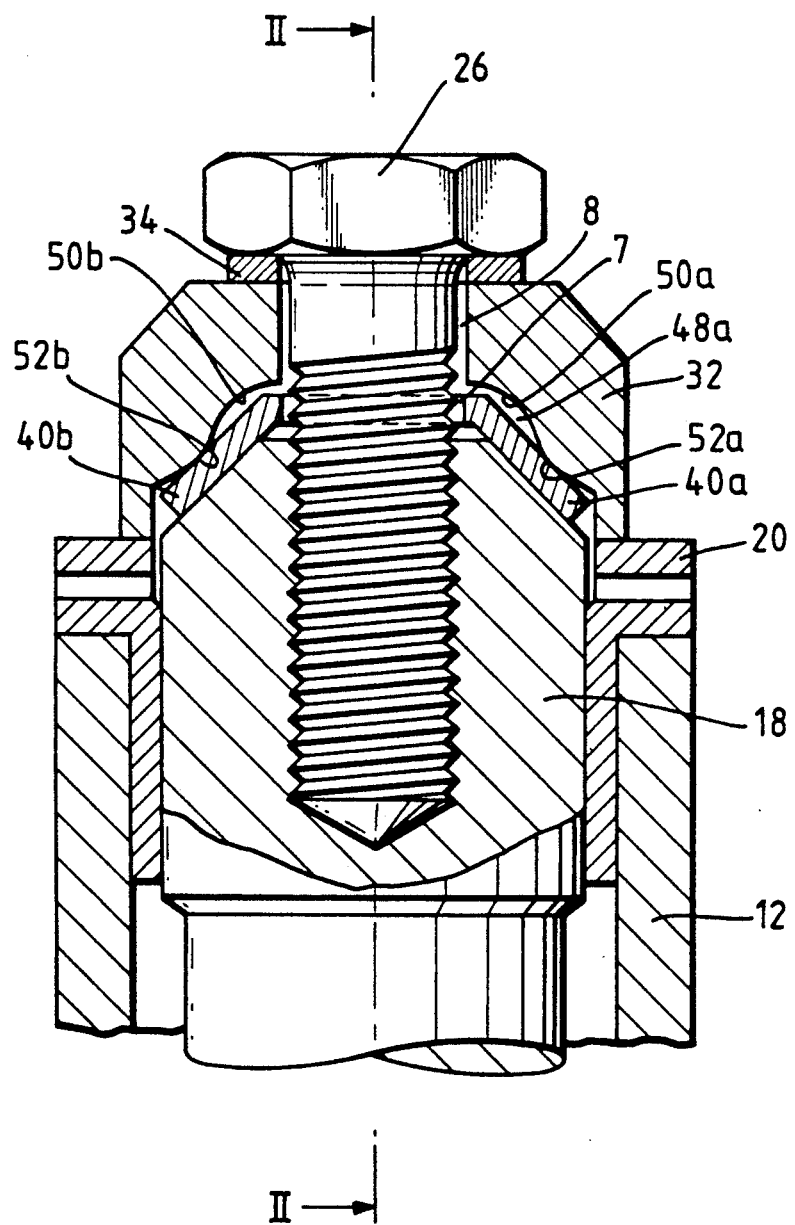
FIG. 3 is a section along line III—III of FIG. 2 through a vane lever and a clamp.
Figure 4:
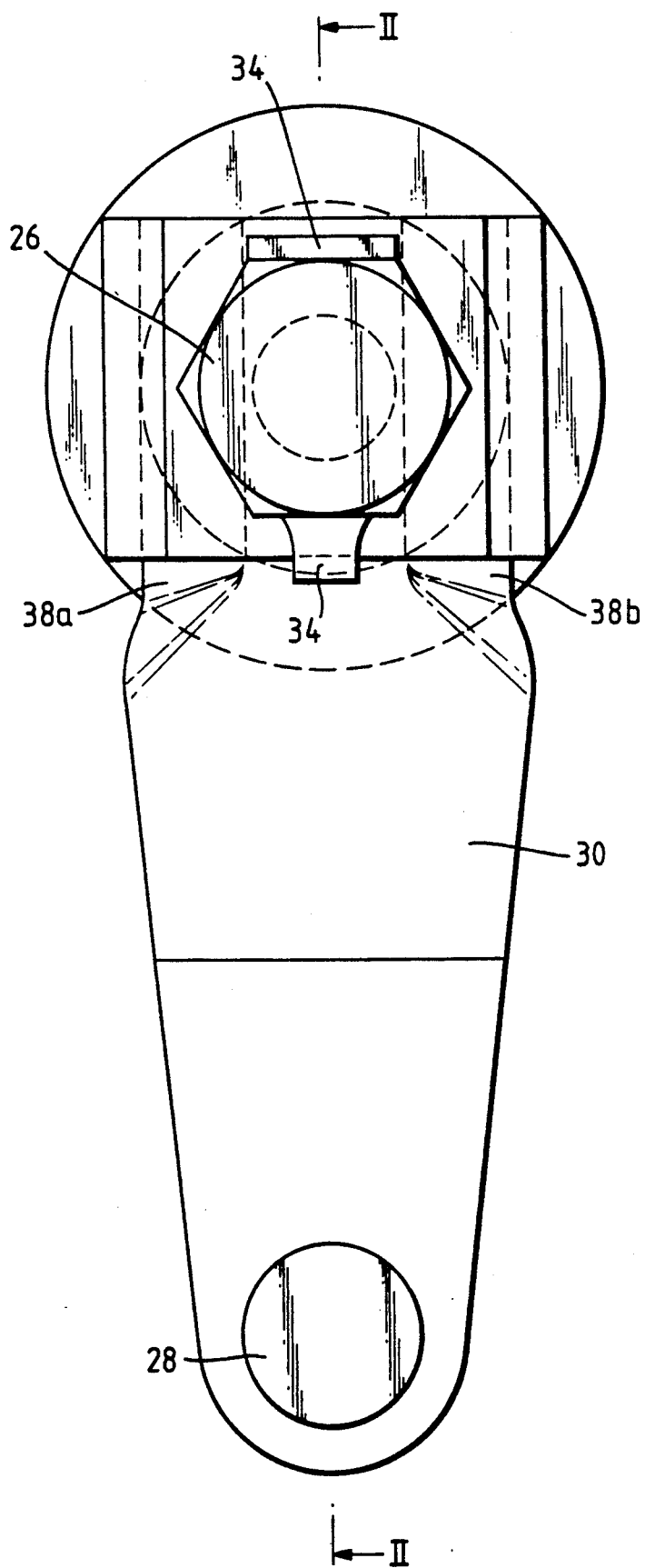
FIG. 4 is a plan view of the assembly of FIG. 2, taken in the direction of arrow IV.

That end of the vane lever 30 secured to the vane stem 18 is trough-shaped, being made by bending opposed edges 38a, 38b of the lever towards each other to form side portions 40a, 40b either side of a longitudinal strip portion 42, and is adapted to fit onto the wedge end of the vane stem in a cooperative relationship. However, the angle between the side portions 40a, 40b is such that, when the lever is unconstrained by any applied forces, it is greater than the angle between the wedge faces 36a, 36b of the vane stem 18. Consequently, when the trough end of the vane lever 30 is placed on the wedge end of the vane stem 18 when unconstrained and facing generally the longitudinal axis of the engine only edges 44a, 44b between the wedge faces 36a, 36b and the end face 46 will be in contact with the vane lever, as is shown in FIG. 5.

The clamp 32 comprises a block provided with a generally wedge-shaped channel 48a having side walls 50a, 50b adapted to fit over the trough end of the lever 30 when the latter is in location on the wedge end of the stem 18.

Each side wall 50a, 50b is provided with an inwardly facing longitudinal projection 52a, 52b respectively.

When the clamp 32 is urged towards the vane stem 18 by tightening the bolt 26, the projections 52a, 52b deform the side walls 40a, 40b of the trough end of the lever 30 into full planar contact with the wedge faces 36a, 36b of the vane stem. The thin material of the vane lever 30 thus takes up the exact profile of the end of the stator stem.

The vane lever 30 is by this means held securely and immovably, or fixedly, against the end of the stator vane stem 18, but, by virtue of its strip construction over the greater part of its length, twists about its longitudinal axis and is thus able t transmit the thrust of the actuator ring when the actuator ring 22 rotates without becoming loose at its connection with the vane stem. At the same time the strip is rigid enough to resist bending due to surge loads and mechanical deflections, by virtue, in part, of its partial trough construction. The added weight of forged levers linking the actuator ring to the vane stems is thereby avoided.

In other embodiments the vane lever 30 need not be made of metal; it may be made of plastics or composite material.

I claim:

1. A vane actuator associated with each stator vane for use in a gas turbine engine having a set of variable stator vanes and a vane actuator ring, said vane actuator comprising:

an elongated metal vane actuator lever linking a vane stem to the ring, said lever being pivotally attached at one end to the ring and at the other end clamped to a respective vane stem so as to inhibit relative movement between said lever and the stem, said lever further comprising a first portion in the form of a strip extending from the ring towards the stem and a second portion in the form of a trough adapted to locate on a cooperatively shaped end of the stem; and a clamp means to prevent relative movement between the stem and said lever, the arrangement being such that when the ring is rotated about its axis the strip portion of the lever is able to twist about its longitudinal axis and inhibit any tendency of the lever as a whole to twist about its longitudinal axis.

2. A vane actuator as claimed in claim 1, wherein the cooperatively shaped end of the stem is truncated wedge-shaped having opposed planar faces and said clamp means is adapted to clamp opposed faces of said second trough portion into planar contact with the opposed planar faces of the stem.

3. A vane actuator as claimed in claim 2, wherein said clamp means is provided with a channel adapted to fit over said second trough portion of said lever, there being provided means for pressing the clamp means onto the vane stem, opposed faces of said channel each being provided with an inwardly facing projection arranged to contact an outer surface of a respective wall of the said second trough portion to urge said respective wall into full planar contact with a respective wedge face of the end of the vane stem when said clamp means is pressed onto the vane stem.

4. In a gas turbine engine having a set of variable stator vanes, a vane actuator ring, and a set of elongated actuator levers linking the vanes to the ring in a one-to-one relationship, a manner of linking the actuator ring to the vanes comprising:

(a) with regard to each vane, that end of the vane distal from the longitudinal axis of the engine is formed in the shape of a truncated wedge having opposed planar faces, (b) with regard to each lever, the lever comprises a first portion being a strip pinned at one end to the actuator ring so as to be rotatable about the pinning, and a second portion remote from the actuator ring being a strip having opposed edges bent towards each other to form opposed walls, the walls forming a trough generally facing the longitudinal axis of the engine and adapted to locate onto the end of the vane stem in a co-operative relationship, the angle between the walls being greater than the lever is unconstrained than the angle between the wedge faces of the vane stem, (c) there is provided clamp means associated with each vane and lever, the clamp means being provided with a channel adapted to fit over the trough end of the lever when the lever is located on said end of the vane stem, opposed faces of the channel each being provided with an inwardly facing projection arranged to contact the outer surface of a respective wall of the trough when the lever is unconstrained to urge said respective wall into full planar contact with a respective wedge face of the end of the vane stem when the clamp means is pressed onto the vane stem, whereby relative movement between the lever and the vane is prevented, and (d) there is provided means to retain the clamp means in a clamping relationship with the vane stem.

5. A manner of linking a vane actuator ring to a set of stator vanes as claimed in claim 4 wherein the first portion of the lever is able to twist about its longitudinal axis when the ring is rotated about its axis.

* * * * *